United States Patent [19]

Quella et al.

[11] Patent Number: 4,482,683

[45] Date of Patent: Nov. 13, 1984

[54] STABILIZED SULFUR-CONTAINING RESINS, SUCH AS POLYPHENYLENE SULFIDE AND METHOD OF PRODUCING THE SAME

[75] Inventors: Ferdinand Quella, Gauting; Hans-Friedrich Schmidt, Eurasburg, both of Fed. Rep. of Germany

[73] Assignee: Siemens Aktiengesellschaft, Berlin & Munich, Fed. Rep. of Germany

[21] Appl. No.: 556,984

[22] Filed: Dec. 1, 1983

Related U.S. Application Data

[62] Division of Ser. No. 388,179, Jun. 14, 1982, Pat. No. 4,447,581.

[30] Foreign Application Priority Data

Jul. 10, 1981 [DE] Fed. Rep. of Germany ....... 3127355
Mar. 16, 1982 [DE] Fed. Rep. of Germany ....... 3209525

[51] Int. Cl.³ ............... C08G 75/16; C08G 75/20; C08L 81/34
[52] U.S. Cl. .................... 525/537; 528/127; 528/226; 528/321; 528/388; 525/535
[58] Field of Search ............ 528/127, 226, 321, 388; 525/537, 535

[56] References Cited

U.S. PATENT DOCUMENTS

| | | | |
|---|---|---|---|
| 4,017,555 | 4/1977 | Alvarez | 525/537 |
| 4,071,509 | 1/1978 | Edmonds, Jr. | 528/388 |
| 4,238,585 | 12/1980 | Bertozzi | 525/535 |
| 4,282,347 | 8/1981 | Tieszen et al. | 525/537 |
| 4,340,697 | 7/1982 | Aya et al. | 525/537 |

FOREIGN PATENT DOCUMENTS

| | | | |
|---|---|---|---|
| 0053344 | 6/1982 | European Pat. Off. | 528/388 |
| 600817 | 5/1978 | U.S.S.R. | 528/226 |

OTHER PUBLICATIONS

Quella, "Thermal-Oxidative Decomposition of Polyphenylene Sulphide at Use and Processing Temperature", *Kunstoffe*, vol. 71, No. 6, (1981), pp. 386–388.

*Primary Examiner*—Allan M. Lieberman
*Attorney, Agent, or Firm*—Hill, Van Santen, Steadman & Simpson

[57] ABSTRACT

Sulfur-containing polymers, such as polyphenylene sulfide are stabilized from releasing sulfur-containing exhaust gases by adding an additive polymer having at least one reactive radical selected from the group consisting of amino radicals, amido radicals, imido radicals, and keto radicals therein, and which is of approximate the same thermal stability as the sulfur-containing polymer, to such sulfur-containing polymer. In other embodiments of the invention, sulfur-stabilization is also achieved by incorporating suitable fundamental building blocks of the additive polymer into the sulfur-containing polymer chain in the form of reactive monomers. Further, in other embodiments, additive polymers or oligomers (so-called telecheles) having reactive radicals at their ends can be introduced into the sulfur-containing polymer chain as copolymers. In addition, low molecular weight compounds having high boiling points and having structures similar to the fundamental building blocks of the sulfur-containing polymers are also effective for stabilizing such polymers.

5 Claims, No Drawings

STABILIZED SULFUR-CONTAINING RESINS, SUCH AS POLYPHENYLENE SULFIDE AND METHOD OF PRODUCING THE SAME

This is a division of application Ser. No. 388,179, filed June 14, 1982, now U.S. Pat. No. 4,447,581.

BACKGROUND OF THE INVENTION

1. Field of the Invention

The invention relates to stabilized sulfur-containing resins and somewhat more particularly to a method of reducing sulfur-containing exhaust gases from sulfur-contfur-containing exhaust gases which are released from PPS. These exhaust gases still have a corrosive effect on metal far below 200° C., i.e,, down into the use temperature range of PPS (F. Quella, *Kunststoffe* Vol. 71, Nr. 6, 1981, page 389). Among other components, these exhaust gases contain $H_2S$, $SO_2$ and thiophenol. The typically added lithium carbonate only absorbs these gases above the PPS manufacturing temperature range, having a maximum of 370° C.

SUMMARY OF THE INVENTION

The invention provides a means of stabilizing sulfur-containing resins, such as polyphenylene sulfide, by absorbing the sulfur-containing exhaust gas given off from such materials.

A suitable absorber for sulfur-containing gases must meet the following conditions:

It must be just as thermally stable as the sulfur-containing resin;
It must be workable in approximately the same temperature range as the sulfur-containing resin;
It must have reactive acceptor groups for the sulfur-containing gases;
It must mix well with the sulfur-containing resin; and
The absorber or additive must still be economical.

In accordance with the principles of the invention, a sulfur-containing resin is stabilized by adding thereto an additive polymer containing at least one aminic radical therein and exhibiting approximately the same thermal stability as the sulfur-containing resin. This additive polymer bonds the acidic gases so that the sulfur-containing exhaust vapors can be readily absorbed.

Testing various polymers which are processable in the temperature range of PPS demonstrated that polymers with acceptor radicals or groups which are effective in the area of low temperatures, such as amines or ketones, are also surprizingly effective at higher temperatures.

An exemplary preferred embodiment of a suitable additive polymer useful in the practice of the invention is polyvinyl carbazol (commercially available under the trademark LUVIKAN S).

Because of its presently high price, a mixture of this additive polymer in an amount up to about 1% by weight, based upon the weight of the sulfur-containing resin, is economical.

In a test at 200° C. on copper metal surfaces, in accordance with the Cu mirror test of Bell Company, the corrosive exhaust vapors of a PPS polymer admixed with a 1% mass component (by weight, based on the weight of the PPS) of polyvinyl carbazol showed a significantly lower amount of sulfur-containing gases than identical PPS polymer provided only with 1% lithium carbonate. The same results were observed with sheet brass electroplated with silver (stored in an enclosed space). With storage conditions extending over a week and at a concentration of polyvinyl carbazol greater than 1%, however, decomposition products of this polymer appeared. However, the amount of polyvinyl carbazol to be added depends on the part to be manufactured. For example, a concentration of 10% Luvikan can be meaningful or useful in very sensitive contact structures which can absolutely not tolerate any sulfur-containing gases. Further, the upper use temperature in such an instance would be selected so as to be relatively low, for example at around 100° C.

In other tests, no decomposition products were encountered with the addition of a polyimide (for example, such as commercially available under the trademark Torlon). The silvered plates were still completely bright after a week of storage in an enclosed space at 200° C. Similarly, tests with polyamides for example PA66 (such as commercially available under different trade designations like Ultramide) also yield corresponding results.

Similar results can be expected from other nitrogen-containing polymers having nitrogen radicals therein and having a thermal stability similar to that of PPS, for example, from polyvinyl pyridine.

Another type of material which was tested for stabilizing PPS was a ketone. In this instance, an absorption mechanism similar to the known bisulfite addition reaction with aldehydes was first suspected. A polyether ether ketone (PEEK, poly-1,4-oxyphenyloxy-p,p'-benzophenone) proved to be an effective absorber of sulfur-containing gases with a quality comparable to that of the aforementioned polyimide. With this type of ketone, an admixture of 1% mass component with a sulfur-containing polymer is economical. However, an addition of 0.1% already produced a sufficient effect extending over a week at 200° C.

A corresponding effect can also be expected from other polymer ketones having thermal stability similar to that of sulfur-containing resins, such as PPS.

DESCRIPTION OF THE PREFERRED EMBODIMENTS

As is known, donor-acceptor complexes, as in the case of polyvinyl carbazol, or addition compounds, as in the case of polyether ether ketones, are not very thermally stable. Therefore, there must be another active mechanism which leads to a stabilization of the thermal decomposition products of sulfur-containing resins, such as polyphenylene sulfide. With such polymers, one suspects a formation of stable redicals, whereby the continued reaction of the thermally formed sulfur radicals is prevented.

Possibly, a chain disassociation thermally occurs (for example as suggested by A. B. Port and R. H. Still, IUPAC 26th Symposium on Macromolecules, Vol. 1, 1979, pp 645–648) in accordance with the following schematic representation:

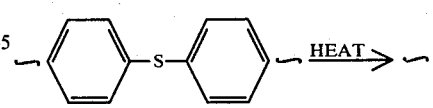

-continued

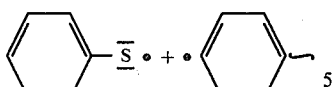

attacking adjacent chains, cross-linking, accelerating decomposition, splitting-off of sulfur-containing gases.

The stabilization mechanism, in accordance with the principles of the invention can, for example, occur in accordance with the following schematic representation:

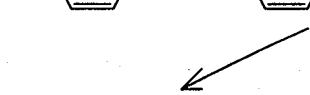

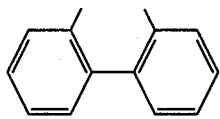

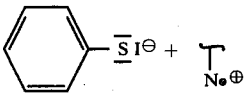

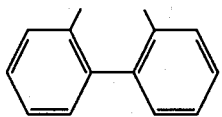

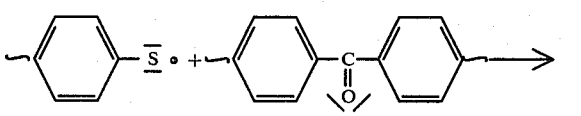

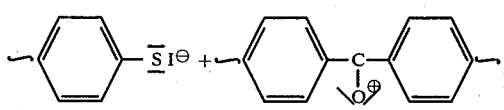

All reaction products are incapable of further accelerating the decomposition.

Since the thermal decomposition of polysulfones as well as other sulfur-containing resins occurs similarly to that of polyphenylene sulfide, an equivalent effect of the additive polymers to stabilize the same, can be expected.

EXEMPLARY EMBODIMENT 1

Polyphenyl sulfide in granular form is admixed with pulverized additive polymer as set forth below and the mixture is subjected to decomposition conditions at 200° C. with a flowing air stream:

| Stabilizer: | Amount Added (% Mass Component) | Amount of Exhaust Vapors in comparison to Ryton R4 = 1 |
| --- | --- | --- |
| Polyether ether ketone | 2 | 0.25 |
| Polyvinyl carbazol | 0.1 | 0.25 |
| Polyvinyl carbazol | 1 | 2.75 |
| Polybutylene terephthalate | 0.1 | 0.40 |
| Polybutylene terephthalate | 0.5 | 1.40 |
| Polyimide (Torlon 4203) | 1 | 0.25 |

The foregoing results were substantiated by means of storage tests (25 g small standard rods for 5 days at 200° C. in an enclosed space) on electro-deposited silver surfaces. In contrast to Ryton R4 (a commercially available PPS having 1% mass component of lithium carbonate admixed therein), the test specimens with lower exhaust vapor concentrations likewise produced very slight or no tarnishing on the silver surfaces.

During decomposition at 300° C., under synthetic air, polyether ether ketone and polymide still exhibited considerable reduction of sulfur-containing gases in comparison to Ryton R4.

EXEMPLARY EMBODIMENT 2

A PPS granulate (Ryton BR-06) was divided into three portions, with two of the portions being thoroughly admixed with the additive polymers specified below and each portion was worked by an injection molding and the exhaust vapor measured at 300° C. with the following results:

| Material | Amount of Additive | Amount of exhaust vapors (relative units) |
| --- | --- | --- |
| Ryton BR-06 | 0% | 1 |
| Ryton BR-06 + Luvican | 0.5% | 0.8 |
| Ryton BR-06 + PA 66 | 3% | 0.5 |

EXEMPLARY EMBODIMENT 3

The amount of exhaust gas from polysulfone (PSU) was measured in the presence of the following additives (PSU without additive=1, at 170° C., air, measured with a sulfur detector)

| Additive | Amount of exhaust vapors (relative units) |
| --- | --- |
| Polyether ether ketone (1%) | 0.5 |
| Polyimide (0.5%) | 1.2 |

The effectiveness of a stabilizer depends upon the fact that it can reach the reactive centers with sufficient rapidity. With a polymer additive, the added polymer must either exhibit a sufficiently high chain mobility in order to engage in the decomposition process at the correct time or it must agglomerate to, for example, the PPS chain in a manner of a complex. The first case is conditioned by the nature of the added polymers, the second case occurs during melting, as in injection molding.

A mechanism which does justice to both cases can be achieved by incorporating suitable fundamental building blocks into the sulfur-containing resin chain in the form of a co-polymer. For example, since PPS is manufactured by means of condensation, it is readily feasible to introduce suitable groups by means of a co-condensation reaction. During the manufacture of PPS in accordance with the following schematic equation:

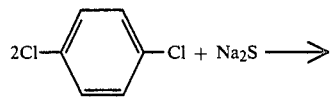

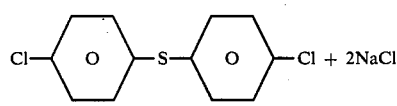

In addition to the dichlorobenzene and Na₂S, a suitable comonomer could be added. For example:

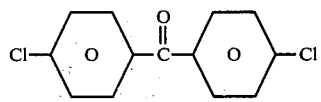

corresponding to the polyether ketone (PEEK) or

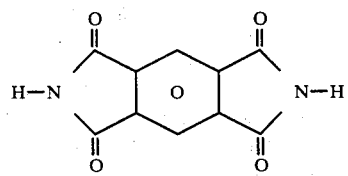

corresponding to the components of a polyimide, such as Torlon. However, the introduction of certain groups, such as polyvinyl carbazol, is difficult because polyvinyl carbazol is radically polymerized.

In other embodiments of the invention, one can introduce polymers or oligomers (so-called telecheles) which carry suitable reactive groups at their ends. Since PPS is manufactured in very low molecular weights during initial manufacturing steps and is only processed into a high molecular weight product during a second "roasting process" at about 150° to 200° C., one can introduce a select oligomeric or low-molecular weight component with the aforementioned groups after the first maufacturing step (if need be, given a renewed addition of Na₂S) for example, in accordance with the following schematic equation:

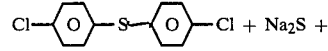

oligomer

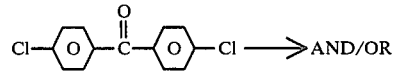

monomer

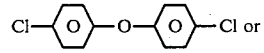

oligomer

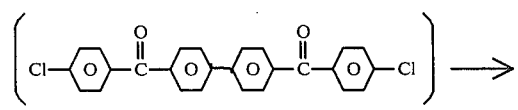

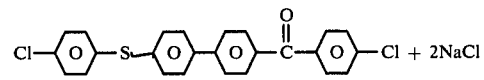

The co-condensed components would have to be added in the same amount range as the stabilizer polymers (i.e. 0.1% up to approximately 5% mass component) so as not to alter the mechanical properties of PPS or other sulfur-containing resin.

The functional stabilizer groups selected for the co-condensation reactions are also present in low-molecular weight substances. However, problems occur with low-molecular weight additives when their boiling point is too low because they can then evaporate out of the reaction or deposit on the surface of the parts as coatings. Further, such low-molecular weight substances cause problems when the migration rate is high (a danger of efflorescence is present with low-molecular weight substances); or when such substances can be washed out with water (which is the case with humid storage conditions).

Suitable low-molecular weight substances which, however, must exhibit relatively high mol masses are set forth below as representatives of corresponding material classes:

Carbazols, boiling point 354° ... 355° C., corresponding to polyvinyl carbazol (Luvican), water insoluble.

Napthalic acid amides, melting point 307° ... 308° C., corresponding to polyimide (Torlon)

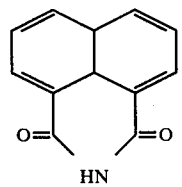

Methoxy benzophenones, boiling point 354° ... 355° C., corresponding to polyether ether ketone (PEEK)

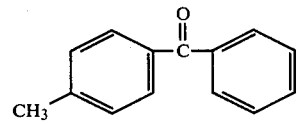

or, substituted diphenyl ether kyaphenine (triazine derivative)

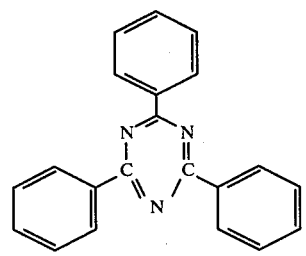

boiling point 350° C.; melting point 231° C.

The foregoing highly conjugated substances are to be understood as being representatives of highly conjugated amines (carbazol), ketones (methoxybenzophenone), amides (naphthalic acid imide) and triazine derivatives (kyaphenine). As a result of their analogous structure to the additive polymers, an effect corresponding to that shown by these additive polymers is attainable. However, a reduction of effect can occur as a result of oxidation, for example, with carbazol and naphthalic acid imides, over the NH group during processing. To this degree, representatives of this group of substances, which are trebly substituted at their respective nitrogen atoms, are preferred to the N—H-compounds. The ketones and triazine derivatives do not exhibit these disadvantages. In the case of triazine derivatives, no corresponding technically usable polymer is presently known.

The greater mobility of the low-molecular weight substances favors them at low use temperatures, for example, at temperatures below 200° C. The higher migration capability (efflorescence) and possible evaporation in the high processing temperature range, for example, at 370° C., makes these kinds of material inferior to the polymer additives under certain conditions.

Substituted (sterically impeded) phenols, for example, phenolic resins, also appear to be fundamentally suited as stabilizers, however, their thermal stability is not sufficient. The same also applies to other inhibitors.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim as our invention:

1. A method of reducing sulfur-containing exhaust gases from polyphenylene sulfide comprising:
   adding an effective amount of an additive material selected from the group consisting of condensable polymerizable aromatic ketones, condensable polymerizable aromatic amines, condensable polymerizable aromatic amides, and condensable polymerizable aromatic imides in the form of reactive monomers to base materials forming polyphenylene sulfide during the manufacturing process of polyphenylene sulfide, said effective amount being in the range of about 0.1% to about 5% by weight, based on the weight of said polyphenylene sulfide; and
   subsequently incorporating said additive material into the polymer chain of polyphenylene sulfide as a copolymer, whereby at least some sulfur-containing exhaust gases given off from said polyphenylene sulfide are absorbed by said additive material.

2. A method as defined in claim 1 wherein said condensable polymerizable aromatic ketones, amines, amides and imides are in the form of reactive oligomers.

3. A method as defined in claim 2 wherein said reactive oligomers are added during a roasting process in the manufacture of polyphenylene sulfide and are subsequently incorporated into the polymer chain of polyphenylene sulfide as copolymers.

4. A method of reducing sulfur-containing exhaust gases from polyphenylene sulfide comprising:
   adding an effective amount in the range of about 0.1% to about 5% by weight, based on the weight of polyphenylene sulfide, of a relatively low molecular weight additive material having a boiling point greater than 300° C. to polyphenylene sulfide, said additive material being selected from the group consisting of polymerizable aromatic ketones, polymerizable aromatic amines, polymerizable aromatic amides and polymerizable aromatic imides, whereby at least some sulfur-containing exhaust gases given off from said polyphenylene sulfide are absorbed by said additive material.

5. A sulfur-stabilized resin material comprised of a sulfur-containing polymer having an effective amount of an additive material selected from the group consisting of condensable polymerizable aromatic ketones, condensable polymerizable aromatic amines, condensable polymerizable aromatic amides, and condensable polymerizable aromatic imides incorporated into the polymer chain of said sulfur-containing polymer, said effective amount being in the range of about 0.1% to about 5% by weight, based on the weight of said sulfur-containing polymer, whereby at least some sulfur-containing exhaust gases given off from said sulfur-containing polymer are absorbed by said additive material.

* * * * *